Sept. 12, 1961 W. P. KENNEDY 2,999,643

ADJUSTABLE PATTERN IRRIGATION SPRINKLING DEVICE

Filed March 24, 1958 4 Sheets-Sheet 1

INVENTOR.

William P. Kennedy

Sept. 12, 1961 W. P. KENNEDY 2,999,643

ADJUSTABLE PATTERN IRRIGATION SPRINKLING DEVICE

Filed March 24, 1958 4 Sheets-Sheet 2

INVENTOR.

William P. Kennedy

ADJUSTABLE PATTERN IRRIGATION SPRINKLING DEVICE

Filed March 24, 1958

INVENTOR.

William P. Kennedy

ADJUSTABLE PATTERN IRRIGATION SPRINKLING DEVICE

Filed March 24, 1958 4 Sheets-Sheet 4

INVENTOR.

William P. Kennedy

United States Patent Office 2,999,643
Patented Sept. 12, 1961

2,999,643
ADJUSTABLE PATTERN IRRIGATION SPRINKLING DEVICE

William P. Kennedy, 304 Freyer Drive, Marietta, Ga.
Filed Mar. 24, 1958, Ser. No. 723,490
7 Claims. (Cl. 239—97)

This invention relates to irrigation sprinkling devices that have rotary water distribution means and is particularly concerned with such devices that embody cam means mounted interchangeably upon the body of the device with said cam means enabling the device to sprinkle any one of a multiplicity of area spray patterns.

In accordance therewith, it is among the primary objects of the present invention to provide a novel, simple and improved cam-controlled pattern sprinkling device through which the water flow is of constant volume, in which water pressure has a minimum effect on ease of rotation of the distribution means, and in which the area sprinkled is of uniform fluid coverage regardless of pattern.

Another object of the invention is to provide a pattern sprinkler in which blank pattern cams may be marked for specific patterns by the user by actual manipulation of the device while sprinkling and without wetting the user during such operation, and with said blank cams having a circular shape being the maximum diameter of the cam and having a circular mark on the blank marking the minimum diameter so as to facilitate the marking operation.

It is another object of the invention to provide a device of the character described in which the pattern cams are aligned to coincide with the pattern of the area to be sprinkled, provision for more convenient stationing manipulation of the cams and effecting removal from and addition to of other cams in regard to the device.

A further object of the invention is to provide means to effect either a short range, large volume or a long range, smaller volume circular pattern without the use of cams, more convenient means for stationing the device in relation to the ground, and means for greater ease of dismantling and reassembling the device for cleaning and maintenance purposes.

Numerous other objects, features, and advantages of the present structure will be apparent from the consideration of the following specification taken in conjunction with the accompanying drawings, in which.

Figures 1, 2, 3, 4, 5, 6, 7, 8, 9, 10:
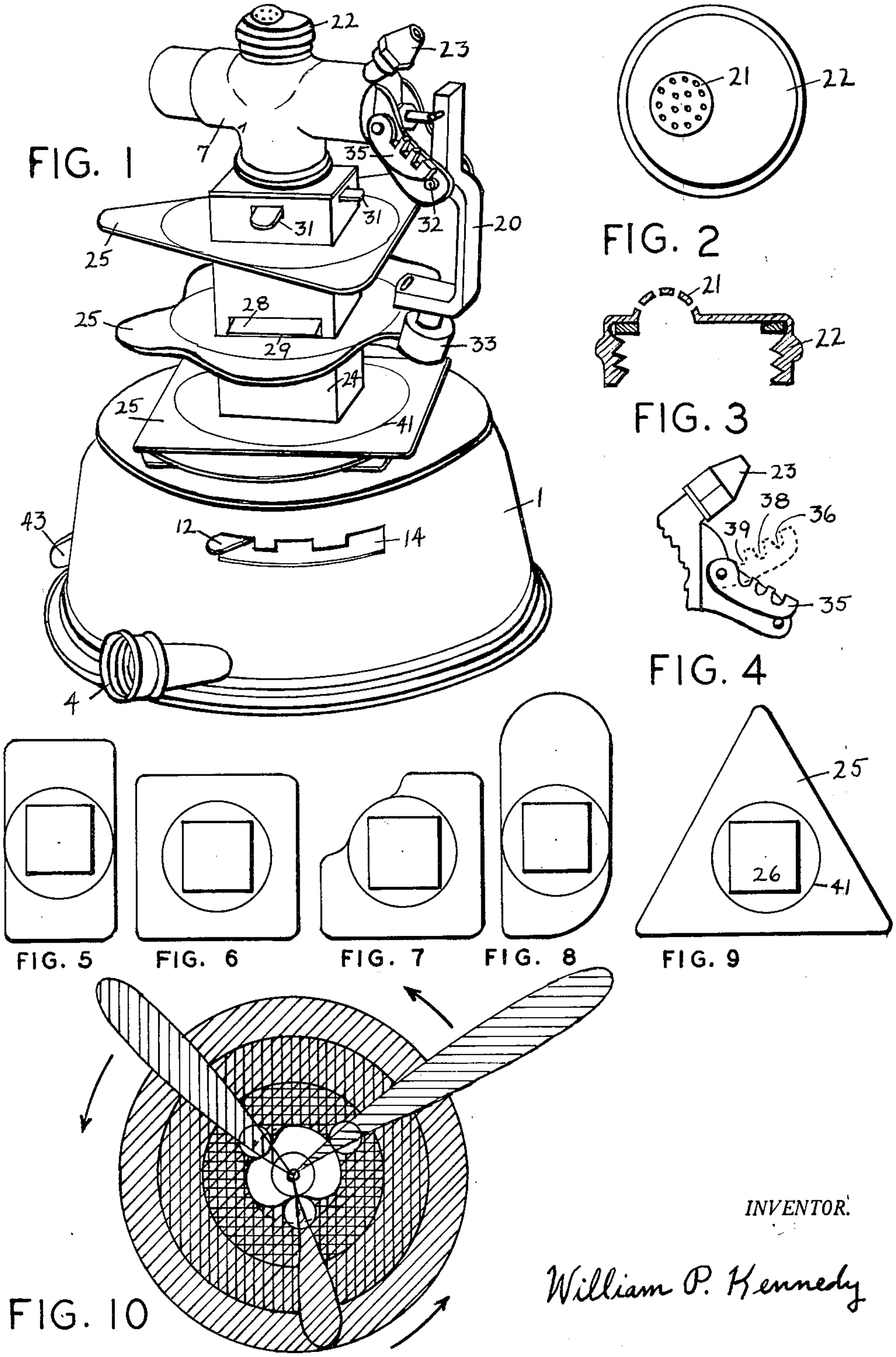
FIG. 1 is a perspective view of the device.
FIG. 2 is a plan view of the center cap nozzle.
FIG. 3 is a sectional view of FIG. 2.
FIG. 4 is an elevation showing the means for latching the lever means.
FIGS. 5, 6, 7, 8 and 9 are plan views showing various shapes of pattern cams.
FIG. 10 is a diagram illustrating the basic principle used by this device to form patterns.

Referring to the drawings, the numeral 1 designates the supporting body of the device in which is mounted a maximum flow water motor 2 provided with reduction gears to reduce the speed of the final gear 3 of the water motor. The water flow entering the water motor through the standard hose connection 4 would exit the motor at 5, pass through the flanged conduit standard 6 and enter the distribution head 7. The distribution head is threadedly mounted at 8 to a sleeve 9 with a gear on its lower end that is in association with the water motor. Horizontally movable about the axis of gear 3 is a base plate 10, supporting an idler gear 11, which may be moved by means of the vertically flexible lever 12 so as to place the gear 11 in either neutral or drive position in regard to the sleeve 9. Also mounted on the base plate 10 is a toothed projection 13 which may be used to lock the sleeve 9 in regard to its turning. These three positions of the base plate are secured by means of the notches in the slot 14 engaging one end of the lever 12. By means of this arrangement, the head can be placed in drive, neutral, or locked position. When in locked position, the head may be turned so as to remove or replace it upon the sleeve 9, and when in neutral the head may be used for grasping the device for movement from one location to another, with the attendant dragging of the attached supply hose, with no danger of damage to the gearing of the device.

Figures 11, 12, 13, 14, 15, 16, 17:
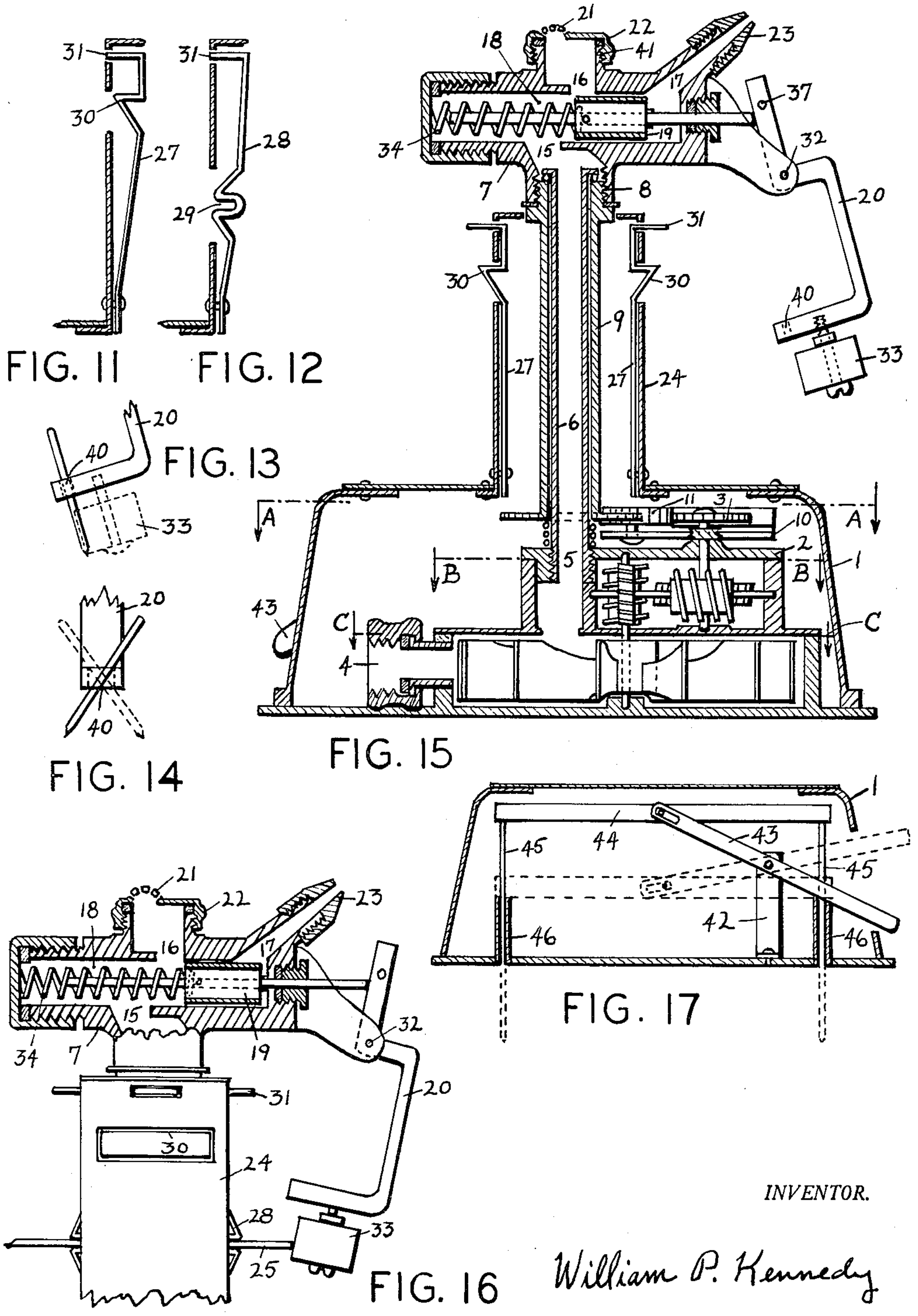
FIGS. 11 and 12 are sectional views of the pattern cam's vertical stationing means.
FIGS. 13 and 14 are views showing means for marking cams for specific area patterns.
FIG. 15 is a vertical sectional view of a side position of the device.
FIG. 16 is a fragmentary surface and sectional view of a portion of FIG. 15 showing the effect of lever movement in regard to parts in the distribution head.
FIG. 17 is a sectional view of the device's base showing the means for horizontal stationing of the device in relationship to the ground.

The distribution head 7, which may be of two general types with their construction being basically similar is shown, one type, herein designated as "A," by FIGS. 1, 15 and 16 and the other type, "B," by FIGS. 22 through 28. Both heads embody a water entry at 15 and distribution exit openings at 16 and 17. Connecting these three openings is a chamber 18 within which is a movable hollow open ended cylinder 19 in type "A" which is slideable within it chamber 18, and 191 in type "B" which is turnable within its chamber 18. As may be seen in their respective drawings, each cylinder is activated by the lever 20 through its associated linkage so as to reciprocatingly open or close the exits 16 and 17 according to the position of the lever. The water exiting the opening 16 through the dished and perforated portion 21 of the removable threaded cap 22 forms a generally horizontal circular spray. The water exiting the opening 17 through the inclined nozzle 23 forms a jet. Movement of the cylinders 19 or 191 varies the amount of water through these exits, as one progressively closes the other progressively opens in either case and hence will cause water to be distributed as illustrated in FIG. 10 depending on the position of the lever 20. This action will not preclude water from discharging from a closed exit as the cylinder fits relatively loosely in the chamber thereby passing some water through a closed exit. This feature prevents such discharge from losing its spray characteristics.

In order to simplify the drawings, the nozzle 23 is shown as a threaded cap with a discharge opening. To vary the size of the discharge opening, caps of different size openings may be screwed to the cap's base, or the nozzle may be any one of a great number of adjustable orifice nozzles which are presently obtainable commercially.

Mounted upon and a part of the body 1 is a vertical shaft 24, generally square in plan, upon which are vertically movably stationed a multiplicity of relatively thin cams 25 of an outside edge contour conforming substantially with the shape of the area to be sprinkled. Several possible shapes are shown in FIGS. 5 through 9. Each cam has an opening 26 to conform with the shape of the shaft 24 and of a size large enough to permit vertical sliding but to preclude horizontal turning in regard to the shaft. Mounted to the shaft 24 are two pairs of formed spring clips 27 and 28, of a general shape as shown in FIGS. 11 and 12, whose projections extending through suitably placed openings in the shaft will retain the cams in vertical placement on the shaft, any or all cams being capable of being either above or below the operating cam, which is stationed on the shaft by means of the notch 29 in the clip 28, with the upper cams resting on the shoulder 30. The spring tension of the clips normally keep them in projection as shown in FIGS. 15 and 16 but pressure of the user's fingers upon the clip's top projection 31 will retract the notches or shoulders as shown in FIGS. 11 and 12 thus permitting vertical adjustment of the cams on the shaft.

The lever 20 is pivotally mounted at 32 and is provided with a removable wheel 33 at its lower end. This wheel rounds the perimeter of the cam in use and the opposite end of the lever activates the cylinder by means of their respective linkage to control flow according to the contour of the cam as illustrated in FIG. 10. Wheel contact with the cam is caused by the expansion of the springs 34 and 341. The expanding force of the spring, becoming progressively greater as the lever follows the outward projections of the cams, requires more turning power of the water motor and hence slows the speed of rotation of the head in proportion to the amount of cam projection thereby producing a proportionally longer spray time under such circumstances and thus gives a uniform water coverage per square foot of pattern.

Due to the reciprocating action of the cylinder in regard to the spray exits, water pressure in the distribution head has little effect on the movement of the cylinder and its associated parts.

The mounting of the lever 20, in vertical alignment with the jet nozzle, causes the jet direction to be compatible with the alignment of the contour of the cam in regard to the contour of the matching area spray pattern and thereby makes the proper placement of the device in the pattern area considerably easier than if the lever were mounted elsewhere on the device.

Figure 25:
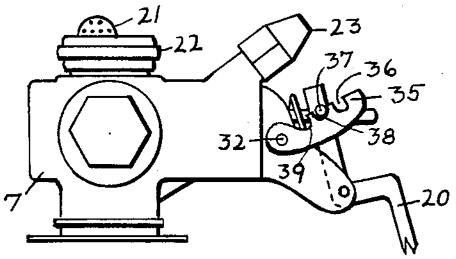
Figures 26, 27, 28:
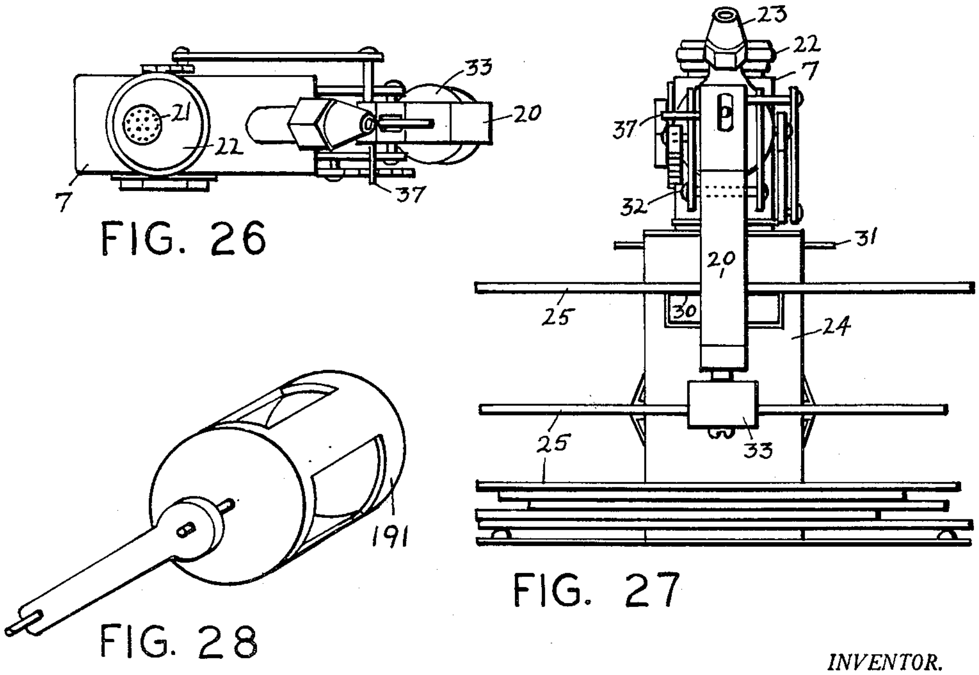
FIG. 26 is a vertical surface view of the head shown in FIGS. 22 and 23.
FIG. 27 is a vertical surface view of a portion of the device showing a front view of the alternate head mounted upon the device.
FIG. 28 is a view of the ported cylinder means used in association with the head shown in FIGS. 22 and 23.

Two types of circles may be formed without the use of cams by means of the notched lever catch 35. By placing the notch 36 upon the projection 37 on the lever, a large area volume, small diameter spray will be produced, whereas by placing the notch 38, as shown in FIG. 25, on the lever projection, a smaller area volume, large diameter spray will be produced. Notch 39 is provided to lock the lever out of action so as to more readily arrange the cams on the shaft.

As shown in FIGS. 13, 14 and 15 a slot 40 in the lever 20 is provided. Upon removal of all cams from the shaft with the exception of a circular blank of suitable diameter located in operating position on the shaft, the wheel 33 and its axle removed, the gearing placed in neutral, the water turned on, and with a stylus inserted through the slot, the user may mark the blank so as to produce a cam for a specific area by moving the head manually around the shaft while moving the lever manually to and fro and observing the throw of water from the jet and marking the blank accordingly. The blank is then removed and cut to its marked pattern. By removal of the cap 21 and securing an open ended length of hose to the exit outlet on the device that is normally covered by the cap, this procedure may be accomplished without wetting the user from the water that issues from exit 16. As shown in FIGS. 13 and 14, the slot holds the stylus point at a point coinciding with the perimeter of the wheel 33, and also permits proper side to side movement of the stylus so as to produce a mark. The shape of the blank is a circular cam of maximum diameter with the minimum diameter 41 marked thereon for convenience in marking patterns.

Figures 18, 19, 20, 21:
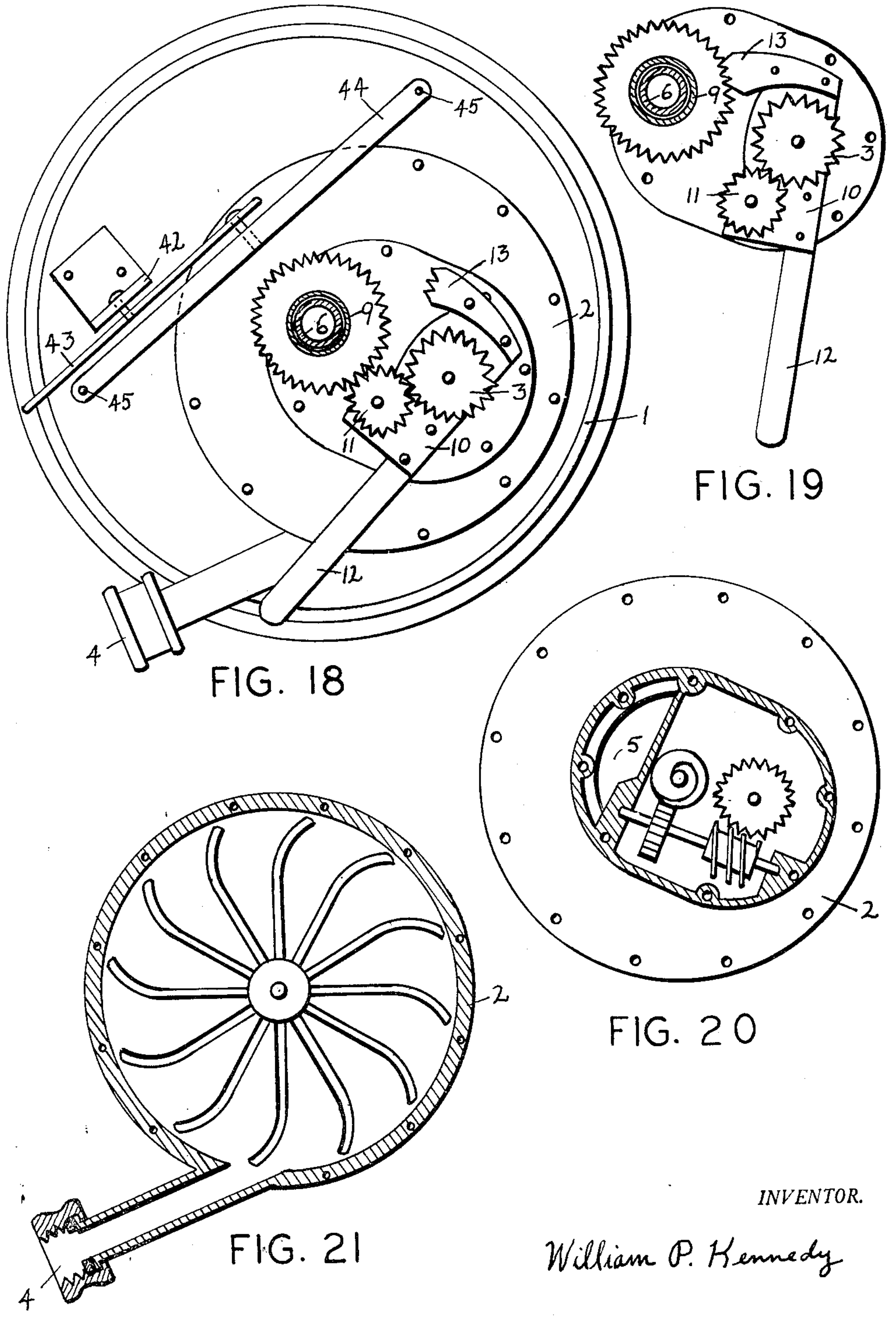
FIG. 18 is a vertical view along the line A—A of FIG. 15.
FIG. 19 is a view of a portion of FIG. 18 showing the head's conduit standard transmission means in locked position.
FIG. 20 is a vertical view along the line B—B of FIG. 15.
FIG. 21 is a vertical view along the line C—C of FIG. 15.
Figure 22:
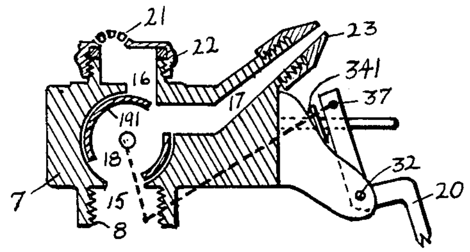
FIGS. 22 and 23 are sectional views of an alternate type of sprinkler distribution head.
Figure 23:
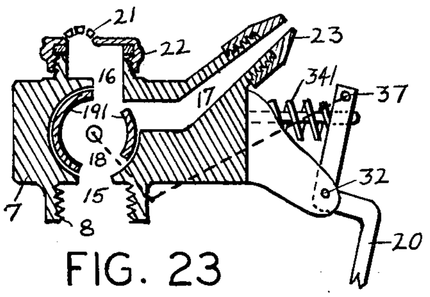
Figure 24:
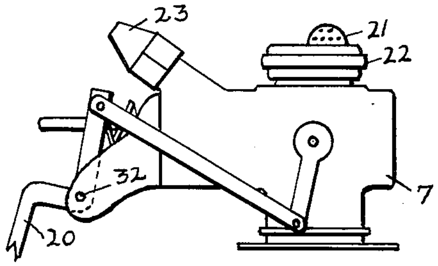
FIGS. 24 and 25 are surface views of the sides of the head shown in FIGS. 22 and 23.

As shown in FIGS. 17 and 18, retractable means are provided for stationing the device in fixed horizontal relationship to the ground so as to prevent lateral turning or displacement of the device and thereby cause the alignment of the cam contour to not coincide with the contour of the area being sprinkled. Secured to the base of the device is a standard 42 at whose upper end is pivotally mounted a lever 43 which connects at one end to a horizontal bar 44 which has at each end a spike 45 which is vertically slideable through a fixed housing 46. By vertical manipulation of the free end of the lever 43, the spikes 45 may be protruded from or withdrawn into the base of the device.

In the practice of the invention, it will be understood that the device is not limited to the specific structural details and arrangements herein presented but the numerous changes, modifications and the full use of equivalents may be resorted to in the practice of the invention without departing from the spirit or scope of the appended claims. It will be further understood that while the invention as herein set forth presents various structural features which may be independently operable and may function for securing various advantageous features, such elements of the invention may be separately used and may be combined other than here presented.

I claim:

1. A cam-controlled pattern sprinkler, including a supporting body, a reduction geared water motor, conduit means connecting said water motor to rotary distribution head means, with said head means including a common fluid entry and two fluid exits with cylinder means reciprocatingly movable within said head means and between said entry and each of said fluid exits, with one exit producing an inclined jet discharge stream and the other exit producing a vertically circular discharge spray, with said cylinder means having connected thereto means to cause a constant volume of fluid entering said entry to be distributed varyingly proportionally through said exits so as to vary the length of said inclined jet stream and vary the diameter of said vertically circular spray so that when said inclined jet stream is shortened said diameter of said circular spray is lengthened and when said jet stream is lengthened said diameter of said circular spray is shortened.

2. The device as set forth in claim 1, in which said cylinder means are longitudinally slideable within said head means.

3. The device as set forth in claim 1, in which said cylinder means are transversely rotatable within said head means.

4. A rotary sprinkler for producing specific area patterns, comprising a supporting body, a reduction geared water motor, conduit means connecting said water motor to a rotary distribution head, with said head including discharge means for producing an inclined fluid jet and discharge means for producing a vertically circular spray, with said head being rotatable by said geared water motor, with control means to proportionally vary the discharge of a constant volume flow of fluid entering said head so as to vary proportionately the discharge from said jet and spray discharge means, said control means including pivoted lever means in association with said head means, cam means in association with said supporting body, and with said lever means in association with said cam means.

5. The device as set forth in claim 4, with means to station a multiplicity of various shaped cams upon said supporting body and means to selectively station any of said cams into or out of association with said lever means.

6. The device as set forth in claim 5, with means for marking cams for production of specific area patterns, with said means enabling the determination of said pattern by manipulation of said means while sprinkling with visual observation of the forming of said pattern.

7. The device as set forth in claim 6, with said means for marking cams while sprinkling providing means so that fluid emitting from said vertically circular spray means may be conveyed into a hose so as to avoid wetting the user during the marking of a cam under such circumstances.

References Cited in the file of this patent

UNITED STATES PATENTS

| | | |
|---|---|---|
| 438,799 | Byers | Oct. 21, 1890 |
| 1,336,236 | Johnson | Apr. 6, 1920 |
| 1,779,983 | Roach | Oct. 28, 1930 |
| 2,047,348 | Wilson | July 14, 1936 |
| 2,300,698 | Pentz | Nov. 3, 1942 |
| 2,560,662 | Rieger | July 17, 1951 |
| 2,601,559 | Riblet | June 24, 1952 |
| 2,654,635 | Lazzarini | Oct. 6, 1953 |
| 2,780,488 | Kennedy | Feb. 5, 1957 |